June 14, 1949.  C. ADAMS, JR  2,473,046
PIPE CLAMP
Filed Nov. 29, 1945  2 Sheets-Sheet 1

INVENTOR.
CHARLES ADAMS JR.
BY
Louis L. Ansart
HIS ATTORNEY

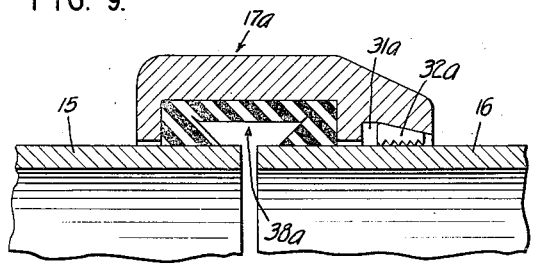
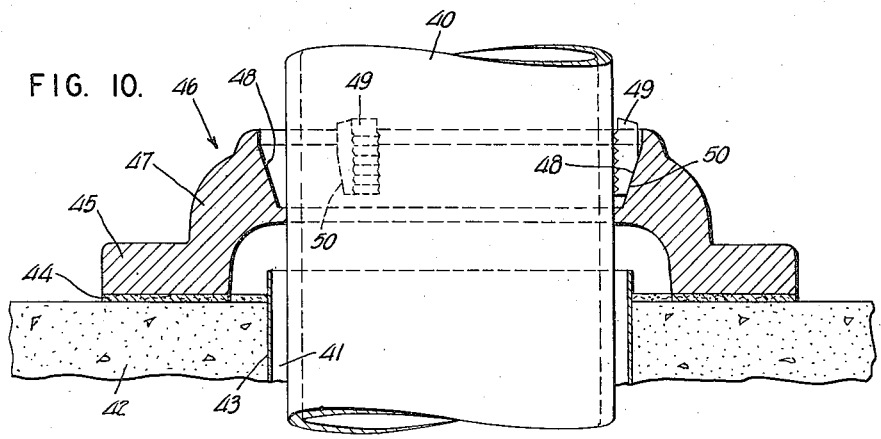
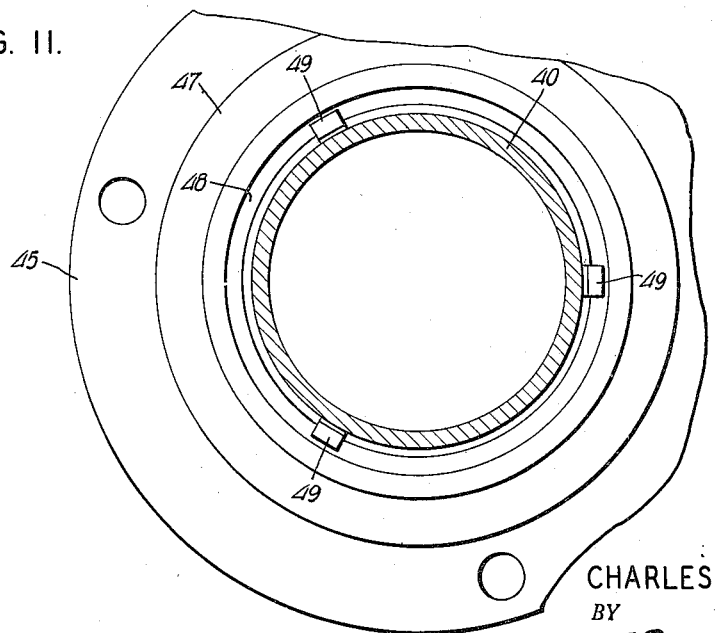
INVENTOR.
CHARLES ADAMS, JR.
BY Louis L. Ansart
HIS ATTORNEY Patented June 14, 1949

2,473,046

UNITED STATES PATENT OFFICE 2,473,046

PIPE CLAMP

Charles Adams, Jr., Croton on Hudson, N. Y.

Application November 29, 1945, Serial No. 631,692

1 Claim. (Cl. 285—194)

The present invention relates to clamps for pipes, and an important object of the invention is to provide novel and advantageous clamps adapted for various uses.

Another object of the invention is to provide a novel and advantageous device for coupling together endwise two members such as two pipes.

Another object of the invention is to provide a novel and advantageous coupling for clamping together the adjacent ends of two aligned pipes and sealing against leakage the joint thus formed.

Still another object of the invention is to provide novel and advantageous means for clamping together two pipe ends by means of a housing provided with internal recesses extending longitudinally of the axis and of means in said recesses to engage the pipes and prevent separation.

A further object of the invention is to provide a novel and advantageous coupling for pipe ends including a housing and means at the interior of said housing to grip said pipe ends with a toggle-like action.

Yet another object is to provide a coupling for two pipes placed end to end comprising a housing extending over the adjacent ends of said pipes and having wedge shaped recesses at the interior of said housing and decreasing in depth from the edges of the housing and wedge shaped members or wedges in said recesses positioned in correspondence to the recesses and adapted to have toggle action.

A further object of the invention is to provide a coupling for two pipes placed end to end comprising a housing extending over the adjacent ends of said pipes and having interior wedge-shaped recesses extending longitudinally, wedges rockable in said recesses and means for holding said wedges in said recesses while the coupling is being installed.

Yet a further object is to provide a novel and advantageous device comprising a housing to surround a pipe and means to connect the housing to the pipe and substantially limit relative movement between the pipe and the housing.

A still further object of the invention is to provide novel and advantageous means associated with a pipe joint clamp to minimize leakage.

A still further object of the invention is to provide a coupling including a plurality of housing members to be clamped around the pipe ends and having longitudinally arranged internal recesses and clamping devices frangibly mounted in said recesses to facilitate assembly and be freed upon clamping the housing members around the pipe ends.

Another object is to provide a coupling comprising housing member with aligned channels at the interior thereof clamped around said pipe ends and a seal between said pipe ends including a channel shaped member of compressible resilient material arranged around circular gap between said pipe ends and with the ends thereof overlapped in close fitting arrangement.

Yet another object of the invention is to provide a coupling for pipe ends comprising sections with a channel at the interior thereof, a sealing strip of channel cross section with the ends overlapped in a close fitting joint, and a flat backing strip of suitable material with overlapping ends in the bottom of said channel to equalize the pressure of the ring gasket on the pipe ends completely around the same.

A further object of the invention is to provide a device surrounding a pipe and adapted to prevent the pipe from being drawn from said device.

Other objects, features and advantages will appear upon consideration of the following detailed description and of the drawings in which Fig. 1 is a side elevation illustrating a clamp embodying one form of the present invention;

Fig. 9 is a fragmentary longitudinal section of another modification;

Fig. 10 is a sectional view illustrating another modification of the invention; and Fig. 11 is a view from above of the structure illustrated in Fig. 10.

Figure 1:
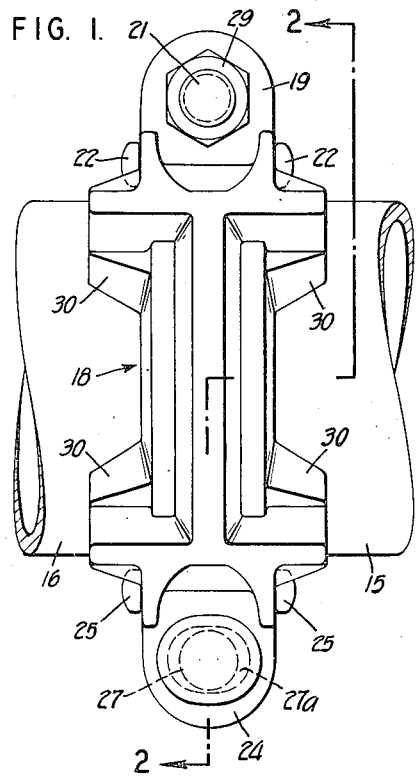
Figure 2:
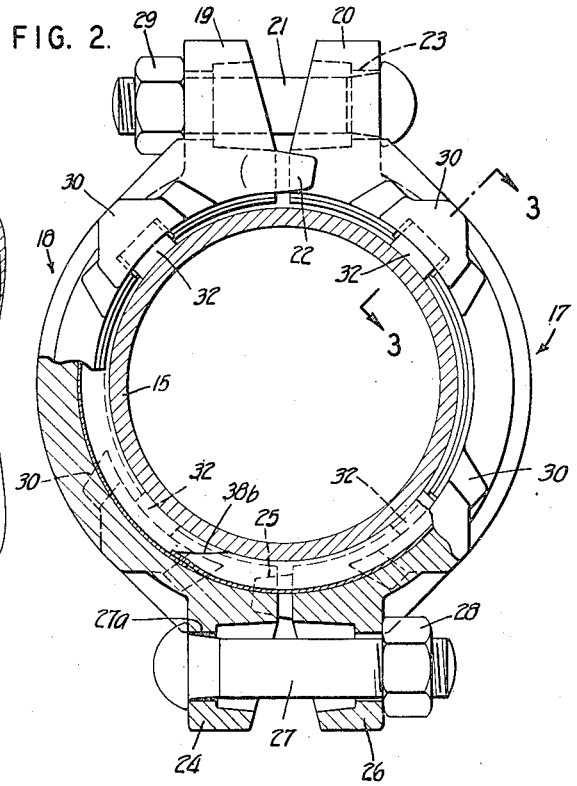
Fig. 2 is a section taken along the line 2—2 of Fig. 1.

Referring to Figs. 1 and 2 of the drawing, two pipe sections 15 and 16 are arranged end to end and connected by a coupling comprising a housing in two parts 17 and 18 which may be identical. The member or part 18 is provided at one end (upper end in Figs. 1 and 2) with an upwardly projecting securing lug 19 having an opening therein to receive loosely a bolt 21 and guiding fingers 22 one at each side extending beyond the securing lug 19 to receive therebetween the adjacent end of housing part 17 beneath a securing lug 20 with an opening 23 through which bolt 21 passes loosely. At the other end of housing member 18, there is a securing lug 24 corresponding to lug 20 and extending between two fingers 25 projecting from the lower end of part 17 at the base of a lug 26. Lugs 19 and 20 are substantially the same as lugs 26 and 24 which are shown in section as hollow. Lugs 24 and 26 are secured together by a bolt 27 and a nut 28, and bolt 21 is provided with a nut 29.

Each member 17 and 18 is provided at each end with two opposed lateral projections 30 which have inner faces inclining away from the pipe ends toward the outer ends of said projections and at said inner faces there are recesses 31 extending longitudinally of the pipes and of increasing depth toward their outer ends thus providing inclined bottoms 31b. The inner and outer ends 31 and 31d of each recess diverge from the ends of the bottom of the recess.

Mounted in each recess 31 is a wedge or wedge-shaped member 32 with its thinner end pointing toward the joint between the pipes. For example, the side of the right hand wedge 32 (Fig. 3) toward the cylindrical surface of the corresponding pipe end is provided with teeth 33. The upper edge of the wedge may be rounded to fit in the rounded corner between the top of the recess and its inclined outer end, thus providing a pivotal connection. When the wedge is positioned with its toothed edge against the pipe, the outer end of the wedge while inclined outwardly and downwardly, is at a smaller inclination from the vertical than the outer end of the recess and the top of the wedge is inclined downwardly and inwardly at a sharper incline to the horizontal than the top of the recess. This arrangement makes it possible for the wedge to have pivotal movement about its upper edge. The inclined bottom and inclined outer end serve to limit the pivotal movement of the corresponding wedge.

Outward movement of a pipe would cause the corresponding wedges to rock and would force the teeth at the inner ends of the wedges into the pipe surface with a toggle action. Inward movement of the pipe would cause the wedges to rock in the opposite direction with much less resistance until the top of the wedge engaged the inner end or top of the recess.

It will be evident that in assembling the sections or segments 17 and 18 around the pipe joint, there would be difficulty in retaining the wedges in the recesses during such assembly unless some provision be made for so retaining them. To meet this requirement each wedge is provided at its sides adjacent its upper edge with two small projections 34 and at each side of each recess there is a rounded groove 35 into which a wire or rod 36 may be driven. Such wires will engage the projections 34 at the opposite sides of a wedge and be wedged between the sides of the wedge and the side surfaces of the recess. In this way the wedges will be held fixed in the recesses during assembly but will not be held against movement when heavily stressed in maintaining connection between the pipes.

The structure thus far described does not provide a fluid seal between the pipe ends. To effect such sealing each section 17 and 18 is provided with an internal groove or channel 37, and these inwardly facing grooves combine to extend around a substantially complete circle. The circle is, however, broken at the gaps between the ends of the segments. According to the present invention, the groove or channel 37 has in cross-section a flat base and sides outwardly inclined therefrom. In said channel is seated a ring gasket 38 of channel form in cross-section and adapted to fit in said groove. As shown in cross-section the channel in the gasket decreases in width from the bottom to its open top.

Figure 8:
Fig. 8 is a section on the line 8—8 of Fig. 7.

The gasket 38 is preferably made by cutting off a strip of proper length from a long strip 39 of gasket material and beveling the ends of the cut off strip so that they will fit together properly in overlapping position along a line 38b when the strip is bent into circular form. In such bending the part at the inside is subjected to compressive action and the outside to stretching action and the cross section is distorted as illustrated in Figs. 5 to 8. Fig. 8 shows the edges of the sides of the channel spread due to the compression. Of course the drawing of the housing sections 17 and 18 together around the pipe ends compresses the side walls of the gasket further.

Without provision of suitable means to prevent such condition, the pressure of the gasket 28 on action, the gasket 28 will tend to bulge outwardly at the gaps the pipe ends may not be uniform and leakage may result. To prevent such undesirable effects, use may be made of a suitable strip 38b of suitable material such as metal fitting in the bottom of the channel. This arrangement will tend to equalize the pressure in the gasket ring completely around the pipe. It may be advantageous to have the ends of the strip 38b overlap as shown at the left lower part of Fig. 2. Then as the housing members are clamped together the ends of the equalizing strip will be caused to overlap to a greater extent and in turn to bring the beveled ends of a gasket strip into overlapping relation as shown in the lower left position of Fig. 2. Preferably the beveled ends are positioned so that the plane between the beveled ends is located just to the rear of the strip 38b. As the overlap of the ends of said strip is increased the beveled ends of the gasket strip will be moved into final overlapping relation.

If desired the ring gasket may be made in unbroken form as by vulcanizing the ends of a strip together, and then stretched over the pipe ends.

Figure 3:
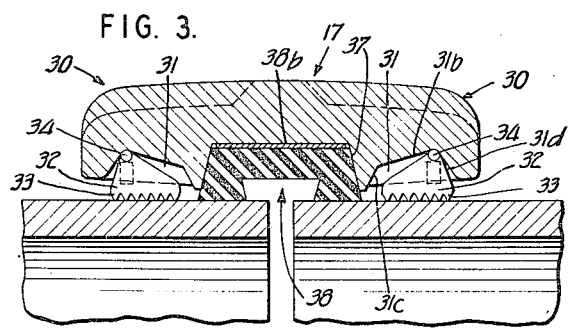
Fig. 3 is a fragmentary section taken along the line 3—3 of Fig. 2.
Figure 4:
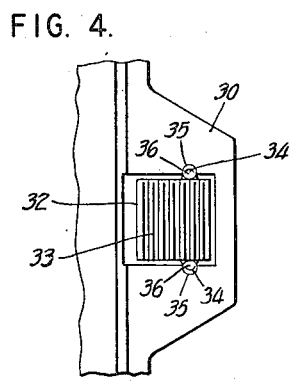
Fig. 4 is a fragmentary view of the inside of one of said coupling members and illustrates the manner in which a wedge member is retained prior to and during installation.
Figure 5:
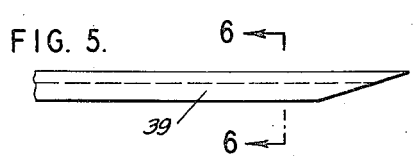
Fig. 5 shows one end of a novel and advantageous gasket for a pipe coupling.
Figure 6:
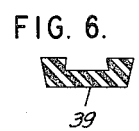
Fig. 6 is a section along the line 6—6 of Fig. 5.
Figure 7:
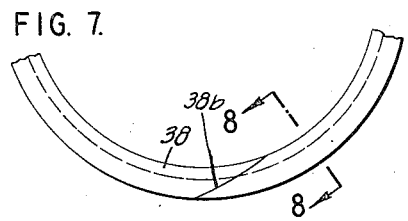
Fig. 7 illustrates the manner of attaching the ends of a gasket strip according to the present invention.

As illustrated in Fig. 3, the housing segment 17 may be replaced by a modified segment 17a wherein at any one location there is at one side only a projection, provided with means for gripping the pipe 16. This gripping means includes a relatively thin wedge 32a in a relatively shallow recess 31a which decreases in depth away from the end of pipe 16. The pipe engaging side of the wedge is provided with teeth to provide a holding engagement with the pipe 16 when the latter is drawn outwardly and consequently the wedge 32 is drawn into the shallow part of the recess 31a. When the pipe 16 is moved inwardly the inner end of the wedge will strike the inner end of the recess and move upwardly until it strikes the top of the recess, whereupon a toggle effect will be produced. Provision of similar holding means is made at the other edge of the segment 17a. In this form of coupling the internal groove or channel has sides perpendicular to its bottom and the gasket 38a therein is of different cross-section from that disclosed in Fig. 3. It should be understood that this segment is to be used with one or more similar segments in forming a coupling. The details of the wedge and gasket shown in Fig. 9 were disclosed and claimed in connection with another coupling disclosed and claimed in my prior application, Ser. No. 523,625, filed February 24, 1944, now Patent No. 2,424,592.

The pipe coupling of the present invention provides an effective flexible connection between pipe ends.

Where there is a vertical line of pipe in a building, it is important to provide means for flexibly supporting the pipe at a floor through which it passes. In Fig. 10, there is disclosed a pipe 40 passing loosely through an opening 41 in a concrete floor 42. A sleeve 43 set in said opening 41, projects above the floor 42 to prevent water or other liquids on the floor 42 from flowing down through the opening unless it overflows the top of said sleeve 43.

The supporting means comprises a member 46 of generally circular form having an annular base or flange 45 resting on a ring or gasket 44 of suitable sealing material spaced from the sleeve 43. This member 46 serves as a combination floor and retaining plate. Above the flange 45 of the member 46, there is a strong arched portion 47 providing ample clearance over the top of the sleeve 43. At the top of arched portion 47 there is an upwardly flaring opening 48 of which the lower end provides a relatively small clearance around the pipe 49. Mounted in guide grooves 50 at intervals around the wall of said opening 48 are toothed wedges 49 which limit downward movement of pipe 49 while permitting some swinging of the pipe.

Where it rises from the flange 45, the arched member 47 is relatively thin but where it turns inwardly toward the horizontal it is much heavier, not only because of its horizontal arrangement but also because it must sustain the outward pressure due to the wedges 49.

The member 46 also serves as a curb or barrier to keep water on the floor 42 from running down through said member 46 and sleeve 43 unless the water rises above the top of said member. The flow of water through member 46 may be entirely shut off by filling the trough between the pipe 40 and the upper part of the member 46 by suitable sealing material as by flowing suitable material into the trough. The sealing material in said trough should be yieldable or flexible to permit longitudinal movement of the pipe without breaking the seal. Axial alignment of the pipe and retaining plate is not necessary and there may be automatic adjustment between these parts to compensate for expansion or contraction of the pipe due to temperature changes.

With flexible connection of the character disclosed, slight variations in alignment cause no trouble. For example, a line of pipe over a rise in the ground or through a depression may be laid without leakage at the joints if the variation in alignment between successive lengths of pipe be not too great.

It will be evident that the present invention provides effective and advantageous means for flexible connection and support of pipes.

It should be understood that various changes may be made and that certain features may be used without others, without departing from the true scope and spirit of the invention.

Having thus described my invention, I claim:

In a device of the character described, a housing for pipe having at its inner surface recesses extending in the same general direction as the axis of the housing, each recess having an inclined bottom whereby the recess increases in depth toward one end and a transverse bearing angle at said end, and a wedge with a transverse edge pivotally engaging said bearing angle, a straight toothed bottom to engage a pipe and a top extending from said transverse edge at a greater inclination than the bottom of the recess when the toothed bottom of the wedge is parallel to the axis of the clamp.

CHARLES ADAMS, Jr.

REFERENCES CITED

The following references are of record in the file of this patent:

UNITED STATES PATENTS

| Number | Name | Date |
| --- | --- | --- |
| 1,497,549 | Conradi | June 10, 1924 |
| 1,930,194 | Dillon | Oct. 10, 1933 |
| 1,986,419 | Taylor | June 1, 1935 |
| 2,009,744 | Pfefferle | July 30, 1935 |
| 2,017,994 | Spang | Oct. 22, 1935 |
| 2,225,208 | Crickmer | Dec. 17, 1940 |
| 2,387,410 | Roe | Oct. 23, 1945 |